United States Patent
Cook et al.

(10) Patent No.: US 8,549,080 B2
(45) Date of Patent: Oct. 1, 2013

(54) METHOD TO IDENTIFY AND DISPLAY CONTRIBUTIONS BY AUTHOR IN AN E-MAIL COMPRISING MULTIPLE AUTHORS

(75) Inventors: Adam R. Cook, Apex, NC (US); Sarah F. Hall, Cary, NC (US); Xinyi Xu, Grand Rapids, MI (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 11/954,492

(22) Filed: Dec. 12, 2007

(65) Prior Publication Data

US 2009/0157818 A1 Jun. 18, 2009

(51) Int. Cl.
  G06F 15/16 (2006.01)
  G06F 17/21 (2006.01)
  G06Q 10/10 (2012.01)
  G06F 3/0481 (2013.01)

(52) U.S. Cl.
  CPC .......... *G06Q 10/107* (2013.01); *G06F 3/04817* (2013.01); *G06F 17/211* (2013.01)
  USPC ........... 709/206; 709/204; 709/205; 715/275; 715/277

(58) Field of Classification Search
  USPC .................. 709/203–207; 715/810, 275–277
  See application file for complete search history.

(56) References Cited

U.S. PATENT DOCUMENTS

| | | | |
|---|---|---|---|
| 6,510,453 B1 * | 1/2003 | Apfel et al. .................... | 709/206 |
| 6,865,715 B2 * | 3/2005 | Uchino et al. ................. | 715/277 |
| 6,970,907 B1 * | 11/2005 | Ullmann et al. .............. | 709/206 |
| 7,421,690 B2 * | 9/2008 | Forstall et al. ................ | 718/100 |
| 7,506,263 B1 * | 3/2009 | Johnston et al. .............. | 715/752 |
| 7,720,916 B2 * | 5/2010 | Fisher et al. .................. | 709/206 |
| 8,015,246 B1 * | 9/2011 | Anderson ...................... | 709/204 |
| 8,200,762 B2 * | 6/2012 | Staats ........................... | 709/206 |
| 2002/0099777 A1 * | 7/2002 | Gupta et al. ................... | 709/206 |
| 2003/0014490 A1 * | 1/2003 | Bates et al. ................... | 709/206 |
| 2003/0050981 A1 * | 3/2003 | Banerjee et al. .............. | 709/206 |
| 2005/0076312 A1 * | 4/2005 | Gardner et al. ............... | 715/853 |
| 2005/0165659 A1 * | 7/2005 | Gruber ........................... | 705/26 |
| 2005/0165740 A1 * | 7/2005 | Kerr et al. ..................... | 707/3 |
| 2005/0166146 A1 * | 7/2005 | Silverbrook et al. .......... | 715/530 |
| 2005/0268237 A1 * | 12/2005 | Crane et al. ................... | 715/732 |
| 2006/0155809 A1 * | 7/2006 | Arav .............................. | 709/204 |
| 2006/0161849 A1 * | 7/2006 | Miller et al. .................. | 715/744 |
| 2006/0190830 A1 * | 8/2006 | Gerstl et al. .................. | 715/757 |
| 2006/0248150 A1 * | 11/2006 | Chaar et al. ................... | 709/206 |
| 2007/0130276 A1 * | 6/2007 | Zhang et al. .................. | 709/207 |
| 2007/0174396 A1 * | 7/2007 | Kumar et al. ................. | 709/206 |
| 2007/0240080 A1 * | 10/2007 | Eldridge et al. .............. | 715/835 |
| 2007/0300153 A1 * | 12/2007 | Newman et al. .............. | 715/530 |
| 2008/0091656 A1 * | 4/2008 | Charnock et al. ............. | 707/3 |
| 2008/0114848 A1 * | 5/2008 | Lira .............................. | 709/206 |

\* cited by examiner

*Primary Examiner* — Catherine Thiaw
(74) *Attorney, Agent, or Firm* — Jeffrey T. Holman (57) ABSTRACT

A method, system and computer program product for displaying authorship and time stamp data within an electronic mail (e-mail) message comprising multiple contributors. The recipient of a multiple author e-mail may view an e-mail inclusive or exclusive of an author's comments. The e-mail client is capable of identifying the author and insertion date of content included within an e-mail message by hovering on or near the word(s)/or phrase utilizing a pointing device. E-mail content may be viewed in chronological order of contribution(s) as selected by the recipient. Contributed content may be displayed chronologically, or color coordinated to avoid displacing key information.

20 Claims, 6 Drawing Sheets

Electronic Mail 300

From: 302  Janice Jacob <jan.jacob@umc.ee.edu>

To: 304  Rosa Smithington <rosa.smithington@umc.ee.edu>

Cc: 306  Blue, Annie(UMC-Student); Almay, Robert (UMC-Student); Paul, Akins (UMC-Student); Penny, Sam(UMC-Student); Showell, Renee (UMC-Student); Mohan, Ashton(UMC-Student); Duane, Young

Subject: 308  Fwd: Intro to Microfabrication 21st Century Sign-up/ Comment

Message: 310

Dr. Smithington
Thank you for presenting this great opportunity to the students. Approximately 8 students have responded within the text of your original e-mail. Happy Sorting! ~Jan ------Original Message------
Students,
*Sign-up to attend Intro to Microfabrication 21st Century by Oct. 2, 2007. Seats are available to the first 5 students to reply to this e-mail. Please give a one sentence statement of why you would like to attend the class.*

Annie Blue – As a senior I am interested in the most recent technology in microfabrication, and I look forward to attending grad school with an emphasis in microfabrication.

Sam Penny - No other classes available.

Mohan, Ashton-10/01/2007, 10:41PM — 312

METHOD TO IDENTIFY AND DISPLAY CONTRIBUTIONS BY AUTHOR IN AN E-MAIL COMPRISING MULTIPLE AUTHORS

BACKGROUND

The present invention generally relates to computer systems and in particular to electronic mail (e-mail) in computer systems. Electronic mail (e-mail) is extensively utilized as a professional, educational, and personal mode of communication. E-mail is a method of composing, sending, and/or receiving messages over an electronic communication system. E-mail messages may be sent over the Internet or within an intranet system which allows users within the network of an organization to e-mail each other. An e-mail may be sent to a single recipient, or multiple recipients, simultaneously.

Several problems exist with sending and/or forwarding a single e-mail to multiple recipients when a reply is expected. When e-mail is sent to a large set of people in a forwarded e-mail chain, recipients often reply within the body of the "original" e-mail message, and then continue forwarding the e-mail. The sender may color coordinate or change the font of the response; however, this is not always the case. When an e-mail is forwarded to multiple individuals (or groups) the responses within the e-mail message may become cluttered and confusing to sort through. The end recipient may receive a message that is no longer credible because of inadvertent (or intentional) erroneous manipulation. Current e-mail technology does not allow the recipient of an e-mail message which has been forwarded multiple times, to view which author sent a part of a message, and at what the (date) the author included the information.

SUMMARY OF ILLUSTRATIVE EMBODIMENTS

Disclosed are a method, system and computer program product for displaying authorship and time stamp data within an electronic mail (e-mail) message comprising multiple contributors. The recipient of a multiple author e-mail may view an e-mail inclusive or exclusive of an author's comments. The e-mail client is capable of identifying the author and insertion date of content included within an e-mail message by hovering on or near the word(s)/or phrase utilizing a pointing device. E-mail content may be viewed in chronological order of contribution(s) as selected by the recipient. Contributed content may be displayed chronologically, or color coordinated to avoid displacing key information.

In one embodiment, the invention provides a method for sorting the authors, date, and time of an incoming e-mail. Utilizing a mail user agent (MUA) such as Eudora™, IBM Lotus Notes™, Microsoft Outlook™, or Outlook Express™, a client creates a single e-mail message addressed to one or more recipients. The e-mail may be forwarded a number of times to multiple individuals. Each individual may insert text and/or information into the body of the e-mail. The original author, as well as each e-mail recipient, may select to view the included messages in chronological order of input, author exclusive, and/or author inclusive.

In one embodiment, the invention provides a method for dynamically displaying author information and a time stamp for information inserted into an e-mail message. A client sends an e-mail to one or more recipients, who then forward the e-mail to one or more recipients, creating a long chain e-mail. Recipients of the e-mail may randomly insert information into the original e-mail body. Authorship and time stamp data are dynamically displayed when a pointing device (e.g. a mouse, pen, biometric type, etc.) is held on or near the text.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for displaying authorship and time stamp data within an electronic mail (e-mail) message comprising multiple contributors. The recipient of a multiple author e-mail may view an e-mail inclusive or exclusive of an author's comments. The e-mail client is capable of identifying the author and insertion date of content included within an e-mail message by hovering on or near the word(s)/or phrase utilizing a pointing device. E-mail content may be viewed in chronological order of contribution(s) as selected by the recipient. Contributed content may be displayed chronologically, or color coordinated to avoid displacing key information (e.g., newest text bright orange, oldest text is light gray).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
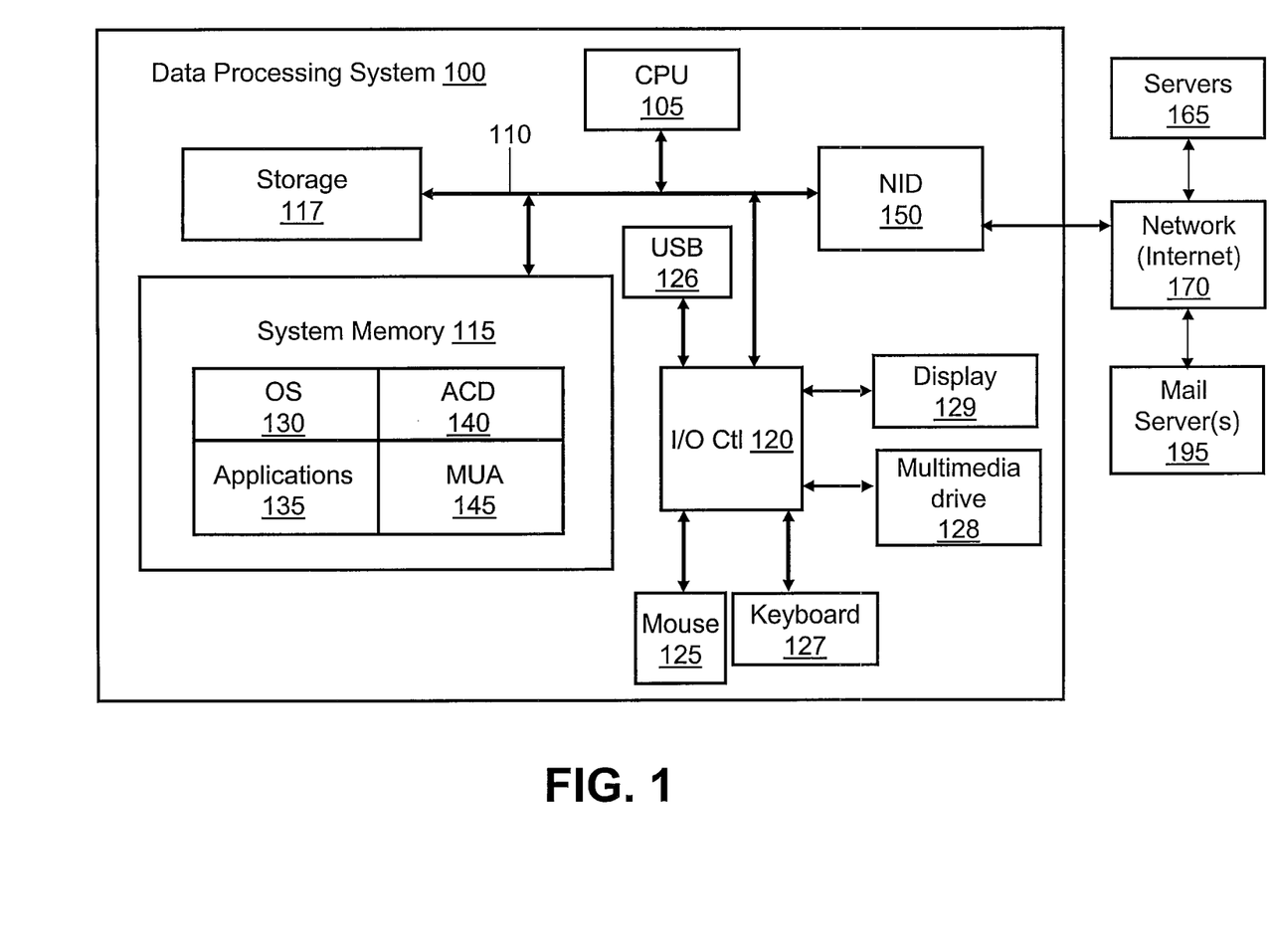
FIG. 1 is a diagram of an example data processing system and network, according to one embodiment of the invention.

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is input/output (I/O) controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 and mail server 195 via an access network, such as the Internet 170. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), applications 135, mail user agent (MUA) 145, such as Eudora™, IBM Lotus Notes™, Microsoft Outlook™, or Outlook Express™ and author contribution display (ACD) utility 140. In actual implementation, MUA 145, and ACD utility 140 may be combined as a single application collectively providing the various functions of each individual software component when the corresponding code is executed by the CPU 105. For simplicity, ACD utility 140 is illustrated and described as a downloadable enhancement to MUA 145 or software modification which provides specific functions, as described below.

CPU 105 executes ACD utility 140, MUA 145, and OS 130, which supports the user interface features of ACD utility 140 and MUA 145. In the illustrative embodiment, ACD utility 140 provides several graphical user interfaces (GUI) to enable user interaction with, or manipulation of, the functional features of the utility (140). Among the software code/instructions provided by ACD utility 140, and which are specific to the invention, are code for: (a) displaying authorship and time stamp within an e-mail; (b) displaying e-mail content in chronological order; and (c) displaying e-mail messages inclusive and/or exclusive of an individual author. For simplicity of the description, the collective body of code that enables these various features is referred to herein as ACD utility 140. According to the illustrative embodiment, when CPU 105 executes ACD utility 140, DPS 100 initiates a series of functional processes that enable the above functional features as well as additional features/functionality, which are described below within the description of FIGS. 2-6.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
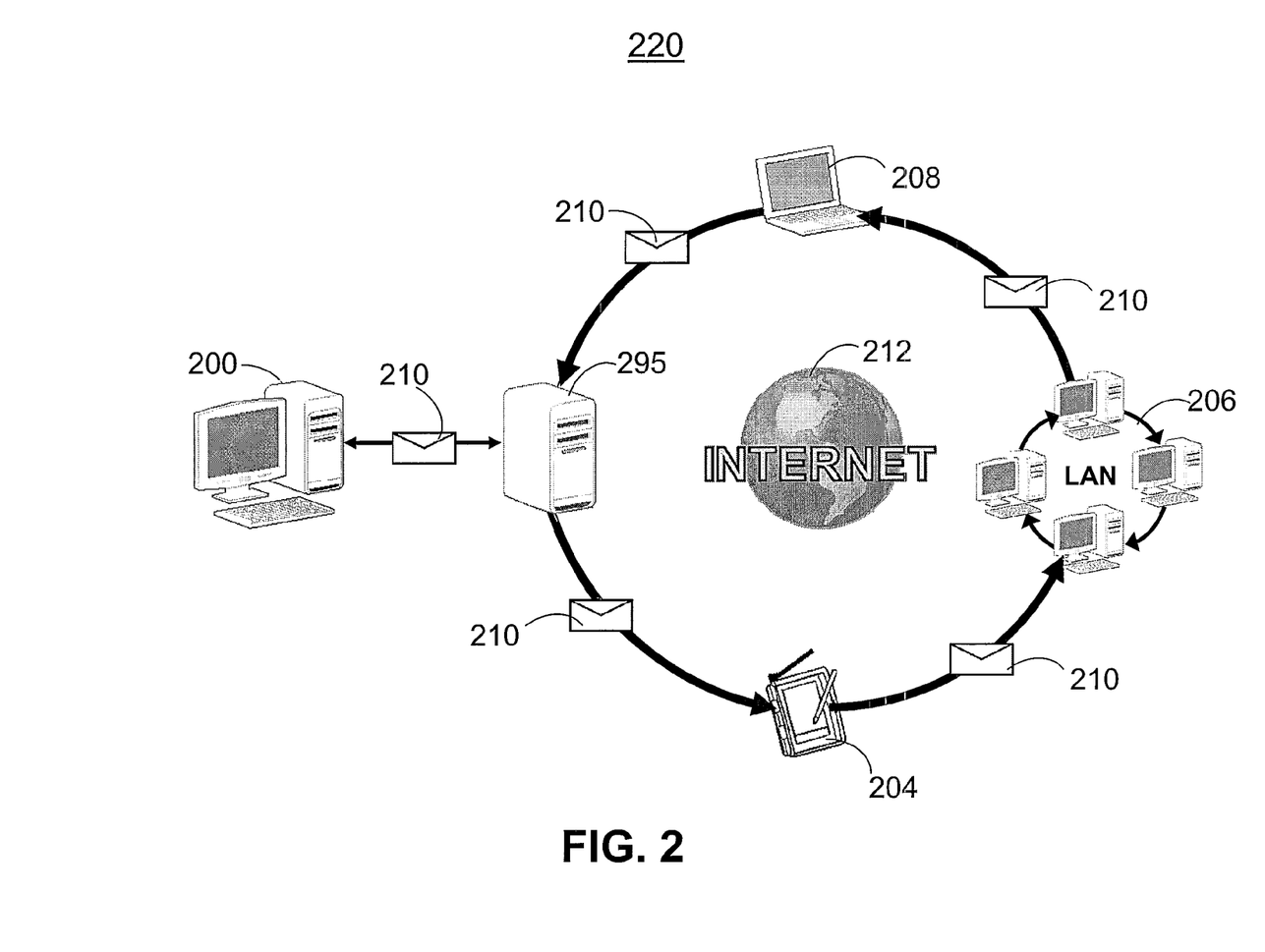
FIG. 2 is a diagram of a network of computers with mail user agents, linked to the Internet, in accordance with one embodiment of the invention.

With reference now to FIG. 2, which illustrates an example network. Network 220 comprises computer system 200, portable device 204, computer network 206, and laptop computer 208, which are connected to mail server 295 through Internet 212. E-mail message 210 is an e-mail which is forwarded through network 220. Portable device 204 may be a PDA, cellular phone, Blackberry™, and any other portable device capable of providing/executing an MUA for sending and receiving e-mails. Computer network is connected via a local area network (LAN), and may represent e-mail forwarded within a small geographical area such as a home, office, or group of buildings.

In one embodiment, annotations are stored on a mail server in metadata associated with e-mail message 210. Annotations, including, but not limited to author name, date, and time are associated with each character of the new content inserted within e-mail message 210. When e-mail message 210 is sent, forwarded, or replied to, a mail server, such as mail server 295, annotates the additions and/or changes, and then stores the changes in metadata on the server. The metadata may be automatically or manually associated with e-mail message 210. Associating the metadata with the e-mail message allows the author, date, and time stamp information to be available while utilizing an e-mail client on and/or off line.

Each computer device within network 220 comprises MUA 145 and ACD utility 140. Computer system 200 sends e-mail message 210 via mail server 295. In one embodiment, within the network, e-mail message 210 is sent to portable device 204 from the MUA on computer system 200, via mail server 295. Utilizing the MUA on portable device 204, information is added to e-mail message 210, then e-mail message 210 is forwarded to computer network 206. One or more clients within computer network 206 may respond to e-mail message 210 by including comments within the body of e-mail message 210, and then forwarding the message to laptop computer 206 within network 220. When e-mail message 210 is forwarded to multiple clients a long chain e-mail is created. In some implementations, e-mail message 210 eventually returns to computer system 200 via mail server 195. Each time e-mail message 210 is sent (i.e., forwarded/responded to), ACD utility 140 (FIG. 1) associated with the MUA and/or mail server associates metadata of the new e-mail content with the sent e-mail message.

While illustrated as physical devices, FIG. 2 is meant to depict different users and/or e-mail recipients who have unique e-mail addresses or mail identifications (IDs). The e-mail address and/or mail ID indicates who the author is, and then the author information may be linked to any content added to the e-mail message by the current user.

Figure 3:
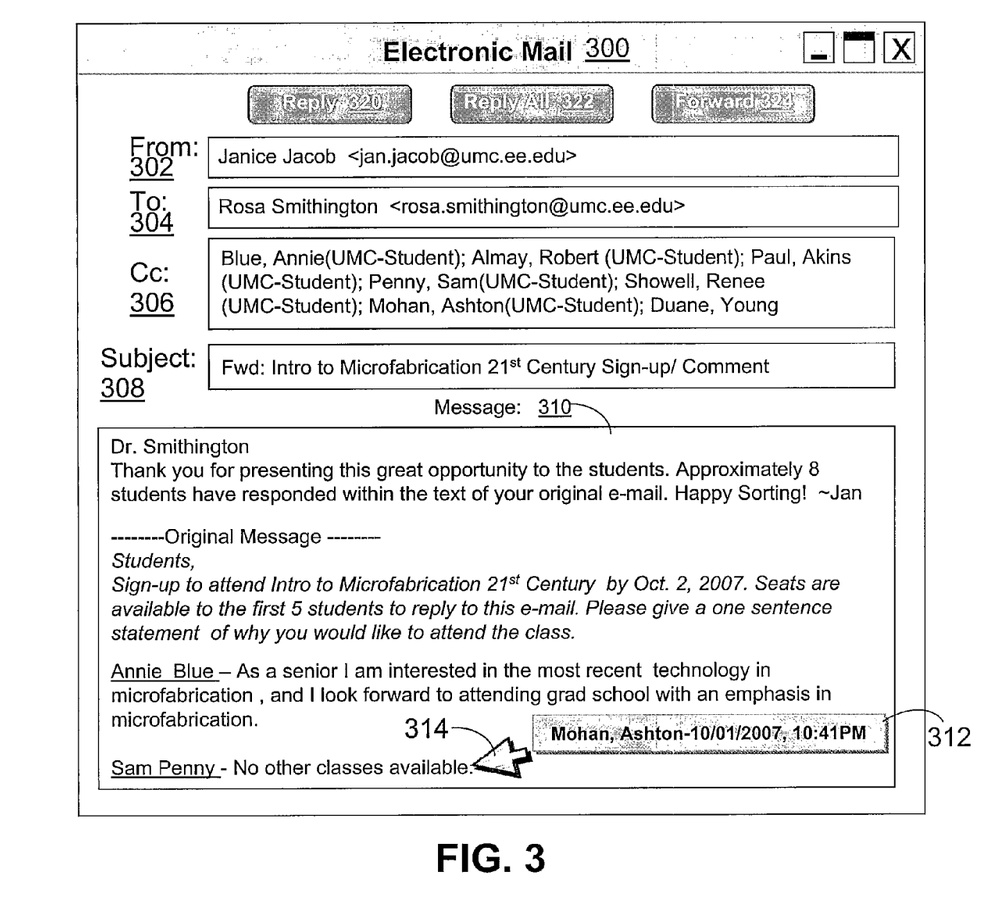
FIG. 3 illustrates a graphical user interface for creating e-mail messages and dynamically displaying the author and time stamp data of the e-mail content, according to one embodiment of the invention.

In FIG. 3, e-mail interface 300 comprises the following information fields: sender (From) field 302, recipient (To) field 304, carbon copy (Cc) field 306, subject field 308, and message field 310. A client may respond to the incoming e-mail by engaging reply 320, reply all 322 (replies to all clients including carbon copied clients), and forward 324. Pointer 314 is provided within e-mail interface 300 to enable user selection and manipulation. Pointer 314 may be controlled via a mouse, pen, and/or biometric (finger) component. Next to pointer 314 is authorship tag 312, which is generated when pointer 314 hovers over the e-mail content of interest. E-mail interface 300 also comprises response buttons reply 320, reply all 322, and forward 324.

In one embodiment, FIG. 3 illustrates an incoming e-mail message that includes content from multiple contributors. Multiple e-mail contributors have included a response within the body of the original e-mail message (310). The e-mail message (310) comprises italicized font to describe the original e-mail message, and the true authorship of added content is identified utilizing pointer 314. Pointer 314 is hovered on or near a character within message 310. Hovering may occur for a threshold period of one or more seconds, or as defined within the e-mail client. When pointer 314 is steady on or near a character (i.e. letter, punctuation, number, and icon) within message field 310 for a preset minimum period (e.g. one or more seconds), the author, date, and time of entry of that character are displayed via authorship tag 312.

With a received e-mail having content provided/contributed by previous authors, the invention includes providing the following functions, among others: receiving an e-mail having content contributed by one or more previous authors who forwarded and replied to the e-mail prior to the e-mail being received; detecting entry of content within the e-mail; automatically associating author information of a pre-identified author set within the e-mail engine as the author for local content generated at the e-mail engine; enabling real-time updating of the pre-identified author to reflect a next author; and automatically associating the next author to any new content received after the real-time updating. Further, with both first time generation e-mail as well as with received e-mail (within an e-mail chain, for example), the invention further includes: transmitting the biographical information associated with the content within the e-mail message, including all authors that have contributed content to an e-mail message chain; and transferring the biographical information of the authors with the transmitting of the e-mail so that the biographical information is displayed in a transmitted e-mail message received at recipient email engine.

Figure 4:
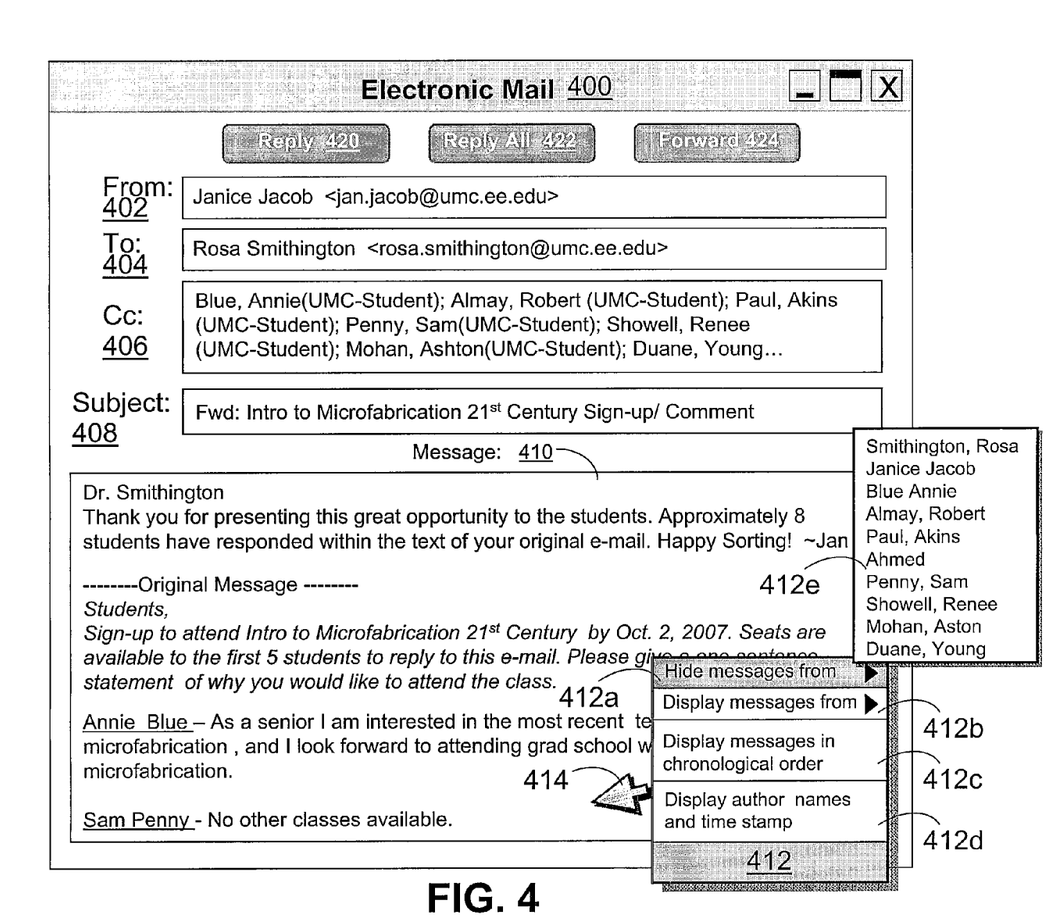
FIG. 4 illustrates a graphical user interface for creating e-mail messages that provides a menu for executing authorship hide and display commands, according to one embodiment of the invention.

FIG. 4, similar to FIG. 3, is an example e-mail interface (400). In FIG. 4, e-mail interface 400 comprises the following information fields: sender (From) field 402, recipient (To) field 404, carbon copy (Cc) field 406, subject field 408, and message field 410. A client may respond to the incoming e-mail by engaging reply 420, reply all 422 (replies to all clients including carbon copied clients), and forward 424. Pointer 414 is provided within e-mail interface 400 to enable user selection and manipulation. Pointer 414 may be controlled via a mouse, pen, and/or biometric (finger) component. Next to pointer 414 is control menu 412. Within control menu 412 are the following menu selections: hide messages from 412a, display messages from 412b, display messages in chronological order 412c, and display author names and time stamp 412d. Selecting the menu selection "hide messages from (412a)" dynamically displays name menu 412e. Menu selection hide messages from 412e list the names of contributors to the e-mail message. E-mail interface 400 also comprises response buttons reply 420, reply all 422, and forward 424.

In one embodiment, double clicking and or right-clicking on a position in message field 410 utilizing pointer 414 displays control menu 412. Control menu 412 allows a client to select from several functions. A user may select "hide messages from [author]" 412a. Selecting hide messages from [author] 412a, reveals a menu which displays the contributors within the message field 410. When the client selects a contributor from the menu, the content provided by that author may be hidden. Hiding the content may include removing the content from message field 410, embossing the content, and/or fading the color of the information inserted by the selected author.

In one embodiment, "display messages from [author]" 412b may be selected, thereby revealing a menu of names. The menu of names comprises the contributors of content within message field 410. Selecting one or more name(s) from this menu removes (or hides) information provided by each of the other contributors not selected; thereby displaying only content inserted by the selected contributor(s).

In another embodiment, a client may select "display messages in chronological order" (412c) from control menu 412. When "display messages in chronological order" 412c is selected, content may be automatically arranged in the order in which it was contributed. Messages may also be displayed in chronological order utilizing color coordination. Color coordination allows the content to maintain the current structural position; however, the color of the inserted text is modified with relation to date and time of the inserted data (e.g. the newest contributed text is bright orange, and the oldest contributed text is light gray).

In one embodiment, "display author names and time stamp" 412d is selected by a user. Selecting "display author names and time stamp" 412d identifies the one or more contributors of content within message field 410 by displaying the biographical information of the content's author. The biographical information includes but is not limited to the name of the author, date, and time the content was input into the e-mail message. When an e-mail message comprises one or more authors, a new authorship tag is displayed where the new contribution begins. The authorship tag displays the name of the contributor and date/time of the contribution in a persistent manner (i.e., no pointer hovering required).

Figure 5:
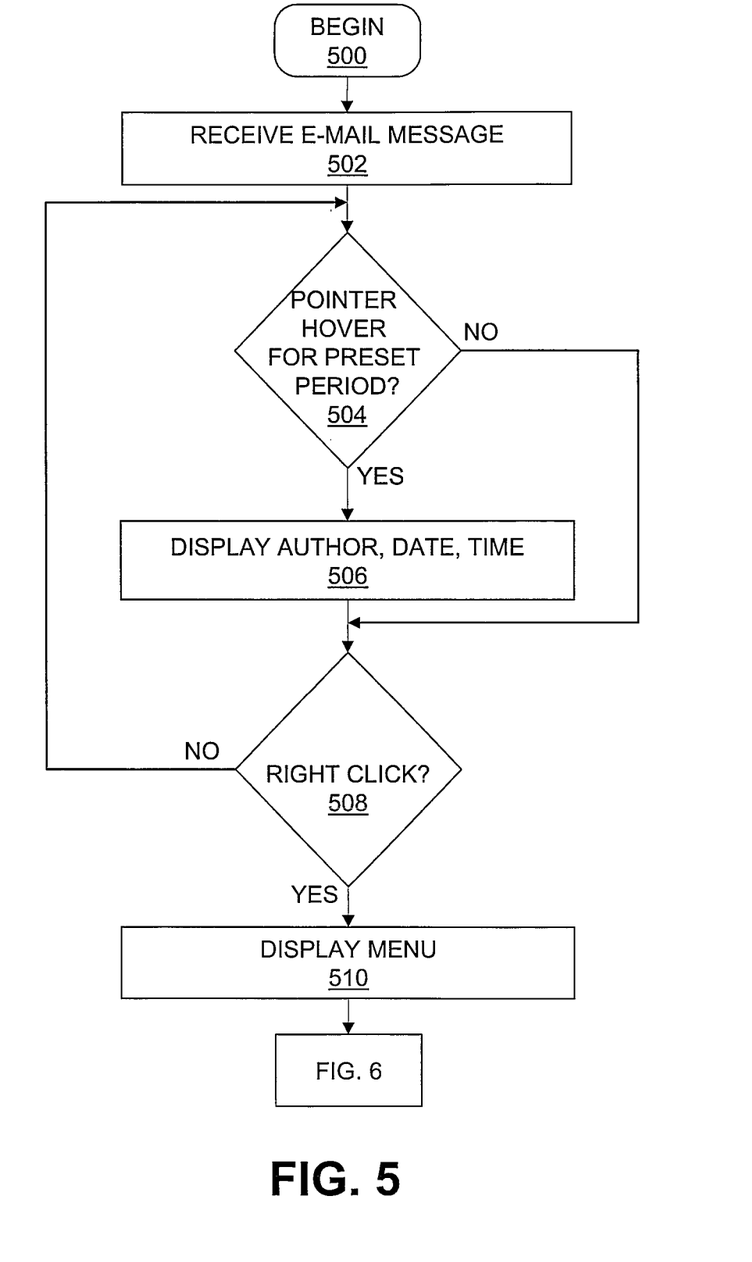
FIG. 5 is a logic flow chart illustrating the method for implementing a selection device utilized to display authorship data in an e-mail, in accordance with one embodiment of the invention.
Figure 6:
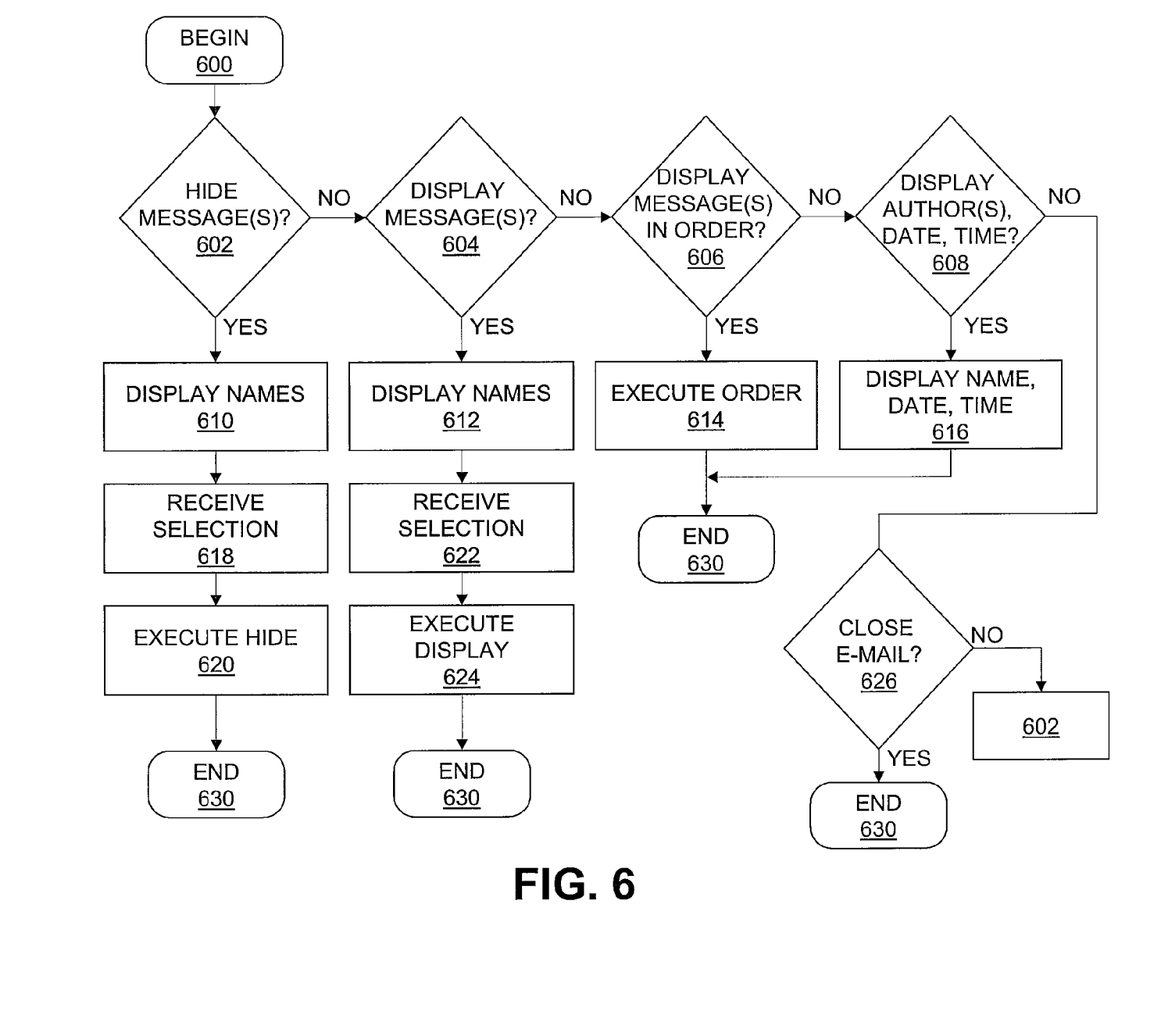
FIG. 6 is a logic flow chart illustrating the process of the mail user agent executing menu commands to display authorship details in an e-mail, according to one embodiment of the invention.

FIGS. 5-6 are flow charts illustrating various methods by which the above processes of the illustrative embodiments are completed. Although the methods illustrated in FIGS. 5-6 may be described with reference to components shown in FIGS. 1-4, it should be understood that this is merely for convenience and alternative components and/or configurations thereof can be employed when implementing the various methods. Key portions of the methods may be completed by ACD utility 140 and MUA 145 executing within DPS 100 (FIG. 1) and controlling specific operations on DPS 100, and the methods are thus described from the perspective of both ACD utility 140 and MUA 145.

The process of FIG. 5 begins at initiator block 500 and proceeds to block 502, at which an e-mail message is received/generated. A decision is made at block 504 as to whether pointer 314 (FIG. 3) has hovered on or near a character within the e-mail message for a preset minimum period which is one or more seconds in the illustrative embodiment. If the pointer has hovered on or near a character for the preset minimum period (one or more seconds) the process continues to block 506. At block 506, the author, date, and time of the content associated with the character over which the pointer hovered is dynamically displayed. If the pointer has not hovered on or near a character, the process continues to block 508. A decision is made at block 508 whether a right-click action or double click action has been received. If a right-click or double click action has been received, the process continues to block 510. If the there is no right-click or double click action received, the process returns to block 504. At block 510, control menu 412 (FIG. 4) is displayed. The process then continues to FIG. 6.

FIG. 6 generally provides the method by which a user is able to manipulate the display of email content that is contributed by multiple authors, perhaps within a received email chain. The user is providing one or more selectable option for viewing authorship information associated with the e-mail message. Among these selectable options are the following: (1) displaying the text within the e-mail along with a display of one or more authors associated with the content; (2) excluding one or more selected authors having contributed content within the e-mail from a display of the e-mail that includes information about other authors associated with other content of the e-mail; (3) displaying the content of the e-mail in a selected order, including one or more of a chronological order, a reverse chronological order, an order of importance of the author, an order of internal authors versus external authors relative to an e-mail group; (4) displaying biographical information associated with the content within the e-mail. As each option is selected, the corresponding action is performed by the email engine to change the display of the content, relative to the selected option.

The process of FIG. 6 begins at initiator block 600 and continues to block 602. At block 602 a selection is detected within control menu 412, whether to hide the display of messages from a particular author. If a selection is received to hide messages from a particular author, the process continues to block 610. At block 610 a list of names comprising each contributor of content within the e-mail message is displayed. The selection of a name is received at block 618. At block 620, the content inserted by the selected contributor (name) is then hidden, while allowing all other messages to be displayed. The process ends at block 630. If the selection to hide messages is not received, the process continues to block 604.

A decision is made at block 604, whether a selection is received to display messages from specific individual e-mail contributors when the e-mail comprises two or more authors. If a decision is made to display the contributed content of an author, the process continues to block 612. At block 612, a list of names of each contributor is displayed. The selection of a name (or names) is received at block 622. At block 624, the contributions of the selected author(s) are displayed and contributions of the other authors (or contributors) are hidden. The process ends at block 630. If the selection to display a particular author's content is not received the process continues to block 606.

At block 606, a decision is made whether a selection to arrange messages in chronological order is detected within control menu 412. If a selection is received to display content within the e-mail message in chronological order, the process continues to block 614. At block 614 the arrangement of the e-mail content in chronological order is executed. The content may be physically arranged in chronological order, or the font color of the e-mail content may be modified, coloring the text according to chronological order (utilizing a color chart/key for guidance). The process then ends at block 630. If the command to arrange the content in chronological order is not received, the process continues to block 608.

A decision is made at block 608 whether a selection to display the authorship of the content of an e-mail message is received within control menu 412. If a selection is detected to display authorship, the name, date, and time in which the content was inserted is displayed. The process then ends at block 630. If a command is not received to display the authorship of the e-mail content, the process continues to block 626. At block 626, a selection is received to close the control menu and/or e-mail message. When the command is received to close the control menu or the e-mail message, the process ends at block 630. If a command is not received to close the control menu or the e-mail message the process returns to block 602.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Further, in the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the client's computer, partly on the client's computer, as a stand-alone software package, partly on the client's computer and partly on a remote computer or entirely on the remote computer or server. In the latter scenario, the remote computer may be connected to the client's computer through a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   dynamically associating author information with text inserted into a body of an electronic mail (e-mail) message;
   displaying within the e-mail message the author information in association with the text, wherein the text is identified as being contributed by the author;
   ordering the text associated with the author information within the e-mail message with respect to other content in the e-mail message according to a received selection, wherein at least a portion of the content in the e-mail message is presented in a non-chronological structural order; and
   applying a color coordination scheme to the e-mail message, wherein the color coordination scheme visually identifies a chronological order of the content based on a color brightness corresponding to the text while maintaining the non-chronological structural order of the content, wherein the chronological order is based on a date and a time of the content.

2. The method of claim 1, wherein the displaying of author information comprises:
   receiving a selection to identify authorship associated with the text within the e-mail message; and
   when more than one author has contributed text to the email, providing a display of identifying information for each different author in association with a specific text contributed by the different author.

3. The method of claim 2, further comprising:
   providing one or more selectable option for viewing authorship information associated with the e-mail message;
   enabling selection of an option from among the one or more selectable options including: (1) displaying the text within the e-mail along with a display of one or more authors associated with the content; (2) excluding one or more selected authors having contributed content within the e-mail from a display of the e-mail that includes information about other authors associated with other content of the e-mail; (3) displaying the content of the e-mail in a selected order, including one or more of an order of importance of the author, an order of internal authors versus external authors relative to an e-mail group; (4) displaying biographical information associated with the content within the e-mail;
   receiving the selection of the option;
   when the selection is to display one or more selected authors, displaying the e-mail message content that is associated with the one or more selected authors;
   when the selection is to exclude one or more selected authors, displaying the e-mail message content that is associated with the one or more authors not selected; and
   when the selection is to display biographical information, displaying the biographical information for the content within the e-mail message.

4. The method of claim 3, wherein displaying further comprises one or more of:
   dynamically displaying the biographical information in a persistent manner; wherein the biographical information is displayed on or near a character contributed by the displayed author within the content;
   outputting e-mail message content from one or more selected authors when the selection is to display one or more selected authors, while disabling the display of the authors not selected; and
   outputting e-mail message content from one or more other authors when the selection is to disable the display of one or more selected authors, while excluding the content within the e-mail message of the one or more selected authors.

5. The method of claim 1, further comprising:
   detecting hovering of a cursor on or near a character within the e-mail message for a pre-set minimum time; and
   automatically displaying information about the character, including a contributing author, when the hovering is detected lasting longer than the preset minimum time.
6. The method of claim 1, further comprising:
   receiving an e-mail having content contributed by one or more previous authors who forwarded and replied to the e-mail prior to the e-mail being received;
   detecting entry of content within the e-mail;
   automatically associating author information of a pre-identified author set within the e-mail engine as the author for local content generated at the e-mail engine;
   enabling real-time updating of the pre-identified author to reflect a next author; and
   automatically associating the next author to any new content received after the real-time updating.
7. The method of claim 1, further comprising:
   transmitting biographical information associated with the content within the e-mail message, including all authors that have contributed content to an e-mail message chain; and
   transferring the biographical information of the authors with the transmitting of the e-mail so that the biographical information is displayed in a transmitted e-mail message received at recipient email engine.
8. A computer program product comprising:
   a non-transitory computer readable storage medium; and
   program code on the computer readable medium that when executed by a processor provides the functions of:
   dynamically associating author information with text inserted into a body of an electronic mail (e-mail) message;
   displaying within the e-mail message the author information in association with the text, wherein the text is identified as being contributed by the author;
   ordering the text associated with the author information within the e-mail message with respect to other content in the e-mail message according to a received selection, wherein at least a portion of the content in the e-mail message is presented in a non-chronological structural order; and
   applying a color coordination scheme to the e-mail message, wherein the color coordination scheme visually identifies a chronological order of the content based on a color brightness corresponding to the text while maintaining the non-chronological structural order of the content, wherein the chronological order is based on a date and a time of the content.
9. The computer program product of claim 8, wherein the code for displaying of author information further comprising program code for:
   receiving a selection to identify authorship associated with the text within the e-mail message; and
   when more than one author has contributed text to the email, providing a display of identifying information for each different author in association with a specific text contributed by the different author.
10. The computer program product of claim 9, further comprising program code for:
   providing one or more selectable option for viewing authorship information associated with the e-mail message;
   enabling selection of an option from among the one or more selectable options including: (1) displaying the text within the e-mail along with a display of one or more authors associated with the content; (2) excluding one or more selected authors having contributed content within the e-mail from a display of the e-mail that includes information about other authors associated with other content of the e-mail; (3) displaying the content of the e-mail in a selected order, including one or more of an order of importance of the author, an order of internal authors versus external authors relative to an e-mail group; (4) displaying biographical information associated with the content within the e-mail;
   receiving the selection of the option;
   when the selection is to display one or more selected authors, displaying the e-mail message content that is associated with the one or more selected authors;
   when the selection is to exclude one or more selected authors, displaying the e-mail message content that is associated with the one or more authors not selected; and
   when the selection is to display biographical information, displaying the biographical information for the content within the e-mail message.
11. The computer program product of claim 10, wherein said code for displaying further comprises program code for completing one or more of:
   dynamically displaying the biographical information in a persistent manner; wherein the biographical information is displayed on or near a character contributed by the displayed author within the content;
   outputting e-mail message content from one or more selected authors when the selection is to display one or more selected authors, while disabling the display of the authors not selected; and
   outputting e-mail message content from one or more other authors when the selection is to disable the display of one or more selected authors, while excluding the content within the e-mail message of the one or more selected authors.
12. The computer program product of claim 11, further comprising program code for:
   detecting hovering of a cursor on or near a character within the e-mail message for a pre-set minimum time; and
   automatically displaying information about the character, including a contributing author, when the hovering is detected lasting longer than the preset minimum time.
13. The computer program product of claim 10, further comprising program code for:
   transmitting the biographical information associated with the content within the e-mail message, including all authors that have contributed content to an e-mail message chain; and
   transferring the biographical information of the authors with the transmitting of the e-mail so that the biographical information is displayed in a transmitted e-mail message received at recipient email engine.
14. The computer program product of claim 10, further comprising program code for:
   receiving an e-mail having content contributed by one or more previous authors who forwarded and replied to the e-mail prior to the e-mail being received;
   detecting entry of content within the e-mail;
   automatically associating author information of a pre-identified author set within the e-mail engine as the author for local content generated at the e-mail engine;
   enabling real-time updating of the pre-identified author to reflect a next author; and
   automatically associating the next author to any new content received after the real-time updating.

15. An electronic device comprising:
   a processor component;
   a mail user agent (MUA) for transmitting e-mails executing on the electronic device; and
   a utility associated with the MUA executing on the processor component and which comprises codes that enables completion of the functions of:
   dynamically associating author information with text inserted into a body of an electronic mail (e-mail) message;
   displaying within the e-mail message the author information in association with the text, wherein the text is identified as being contributed by the author;
   ordering the text associated with the author information within the e-mail message with respect to other content in the e-mail message according to a received selection, wherein at least a portion of the content in the e-mail message is presented in a non-chronological structural order; and
   applying a color coordination scheme to the e-mail message, wherein the color coordination scheme visually identifies a chronological order of the content based on a color brightness corresponding to the text while maintaining the non-chronological structural order of the content, wherein the chronological order is based on a date and a time of the content.

16. The device of claim 15, wherein the displaying of author information further comprises code that enables completion of the functions of:
   receiving a selection to identify authorship associated with the text within the e-mail message; and
   when more than one author has contributed text to the email, providing a display of identifying information for each different author in association with a specific text contributed by the different author;
   detecting hovering on or near the character;
   automatically displaying information based on hovering for a threshold period of time.

17. The device of claim 16 further comprising code that enables completion of the functions of:
   transmitting biographical information associated with the content within the e-mail message, including all authors that have contributed content to the e-mail message; and
   transferring the biographical information of the authors so that it is displayed in the e-mail message.

18. The device of claim 17 further comprising code that enables completion of the functions of:
   providing one or more selectable option for viewing authorship information associated with the e-mail message;
   enabling selection of an option from among the one or more selectable options including: (1) displaying the text within the e-mail along with a display of one or more authors associated with the content; (2) excluding one or more selected authors having contributed content within the e-mail from a display of the e-mail that includes information about other authors associated with other content of the e-mail; (3) displaying the content of the e-mail in a selected order, including one or more of an order of importance of the author, an order of internal authors versus external authors relative to an e-mail group; (4) displaying biographical information associated with the content within the e-mail;
   receiving the selection of the option;
   when the selection is to display one or more selected authors, displaying the e-mail message content that is associated with the one or more selected authors;
   when the selection is to exclude one or more selected authors, displaying the e-mail message content that is associated with the one or more authors not selected; and
   when the selection is to display biographical information, displaying the biographical information for the content within the e-mail message.

19. The device of claim 18 further comprising code that enables completion of the functions for:
   detecting hovering of a cursor on or near a character within the e-mail message for a pre-set minimum time; and
   automatically displaying information about the character, including a contributing author, when the hovering is detected lasting longer than the preset minimum time.

20. The device of claim 19 further comprising code that enables completion of the functions of:
   receiving an e-mail having content contributed by one or more previous authors who forwarded and replied to the e-mail prior to the e-mail being received;
   detecting entry of content within the e-mail;
   automatically associating author information of a pre-identified author set within the e-mail engine as the author for local content generated at the e-mail engine;
   enabling real-time updating of the pre-identified author to reflect a next author;
   automatically associating the next author to any new content received after the real-time updating;
   transmitting the biographical information associated with the content within the e-mail message, including all authors that have contributed content to an e-mail message chain; and
   transferring the biographical information of the authors with the transmitting of the e-mail so that the biographical information is displayed in a transmitted e-mail message received at recipient email engine.

* * * * *